(12) United States Patent
Iwa et al.

(10) Patent No.: US 10,495,041 B2
(45) Date of Patent: Dec. 3, 2019

(54) DIAPHRAGM DAMPER DEVICE, HOLDING MEMBER THEREFOR, AND PRODUCTION METHOD FOR DIAPHRAGM DAMPER DEVICE

(71) Applicant: EAGLE INDUSTRY CO., LTD., Tokyo (JP)

(72) Inventors: Toshiaki Iwa, Tokyo (JP); Yoshihiro Ogawa, Tokyo (JP); Yasushi Fujiwara, Tokyo (JP); Yusuke Sato, Tokyo (JP)

(73) Assignee: Eagle Industry Co., LTD., Tokyo (JP)

( * ) Notice: Subject to any disclaimer, the term of this patent is extended or adjusted under 35 U.S.C. 154(b) by 0 days.

(21) Appl. No.: 15/742,557

(22) PCT Filed: Jul. 28, 2016

(86) PCT No.: PCT/JP2016/072114
§ 371 (c)(1),
(2) Date: Jan. 8, 2018

(87) PCT Pub. No.: WO2017/022604
PCT Pub. Date: Feb. 9, 2017

(65) Prior Publication Data
US 2018/0202401 A1    Jul. 19, 2018

(30) Foreign Application Priority Data

Jul. 31, 2015 (JP) ................. 2015-152620

(51) Int. Cl.
*F02M 55/04* (2006.01)
*F02M 59/44* (2006.01)
(Continued)

(52) U.S. Cl.
CPC ............ *F02M 55/04* (2013.01); *F02M 59/44* (2013.01); *F16B 2/08* (2013.01); *F16F 9/04* (2013.01);
(Continued)

(58) Field of Classification Search
CPC ........ F02M 55/04; F16F 9/0454; F16F 9/049; F16F 15/023; F16F 2226/04; F16B 2/08
See application file for complete search history.

(56) References Cited

U.S. PATENT DOCUMENTS

| 8,955,550 B2 * | 2/2015 | Oikawa ................... F16L 55/04 138/26 |
| 2010/0209274 A1 * | 8/2010 | Oikawa ................... F04B 37/12 417/540 |

(Continued)

FOREIGN PATENT DOCUMENTS

| EP | 2317119 | 5/2011 |
| JP | 51-163718 U | 12/1976 |

(Continued)

OTHER PUBLICATIONS

International Preliminary Report on Patentability dated Feb. 6, 2018.

(Continued)

*Primary Examiner* — Vishal R Sahni
(74) *Attorney, Agent, or Firm* — Grogan, Tuccillo & Vanderleeden, LLP

(57) ABSTRACT

A holding member for a diaphragm damper device including a plurality of diaphragm dampers is formed from an elastic member. The holding member includes a band that can be elastically tightened to circumferential walls of two adjacent ones of the diaphragm dampers and hooks arranged on two sides of the band. The hooks elastically hold each of the diaphragm dampers that are stacked.

11 Claims, 7 Drawing Sheets

(51) Int. Cl.
*F16B 2/08* (2006.01)
*F16F 15/023* (2006.01)
*F16F 9/04* (2006.01)

(52) U.S. Cl.
CPC ............ *F16F 9/049* (2013.01); *F16F 9/0454* (2013.01); *F16F 15/023* (2013.01); *F16F 2222/126* (2013.01); *F16F 2226/04* (2013.01)

(56) References Cited

U.S. PATENT DOCUMENTS

| | | | |
|---|---|---|---|
| 2010/0215529 A1* | 8/2010 | Inoue | F04B 37/12 417/540 |
| 2011/0017332 A1 | 1/2011 | Bartsch et al. | |
| 2012/0087817 A1 | 4/2012 | Lucas | |
| 2018/0195478 A1* | 7/2018 | Iwa | F02M 55/04 |
| 2018/0202401 A1* | 7/2018 | Iwa | F02M 55/04 |
| 2018/0209389 A1* | 7/2018 | Iwa | F02M 59/44 |
| 2018/0223782 A1* | 8/2018 | Yabuuchi | F04B 11/0016 |

FOREIGN PATENT DOCUMENTS

| | | |
|---|---|---|
| JP | 57-57152 U | 4/1982 |
| JP | 59-164251 A | 9/1984 |
| JP | 59-169409 U | 11/1984 |
| JP | 2013-227877 A | 11/2013 |
| WO | 2008086012 A1 | 7/2008 |

OTHER PUBLICATIONS

Chinese Office Action dated Dec. 5, 2018 from corresponding Chinese case. Please see attached English translation.
Extended European Search Report dated Mar. 29, 2019 from corresponding EP Patent Application No. 16832883.9.

* cited by examiner

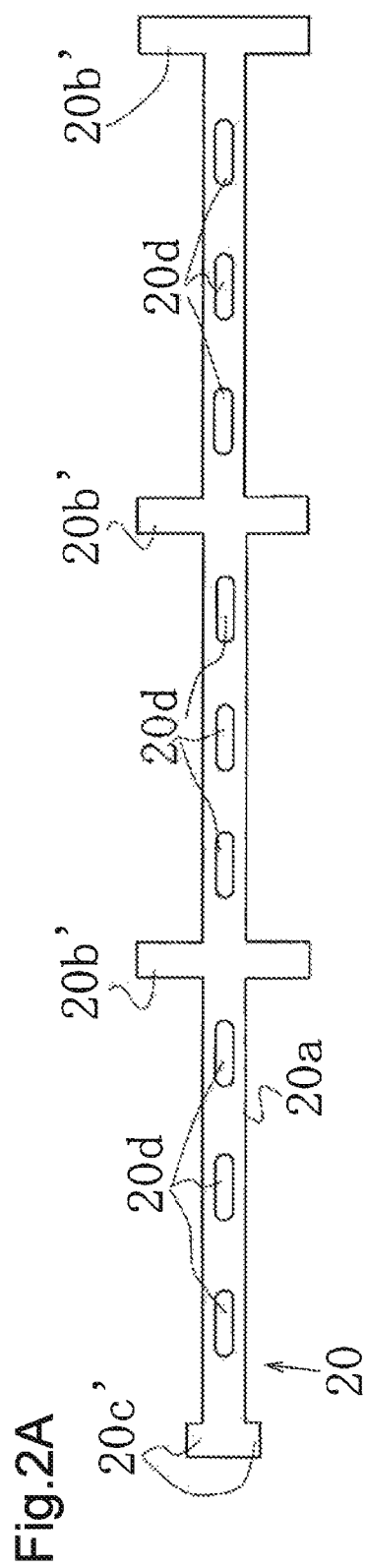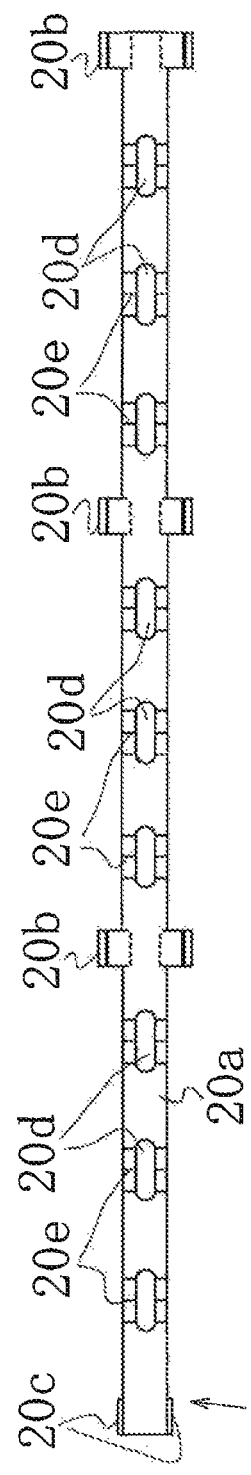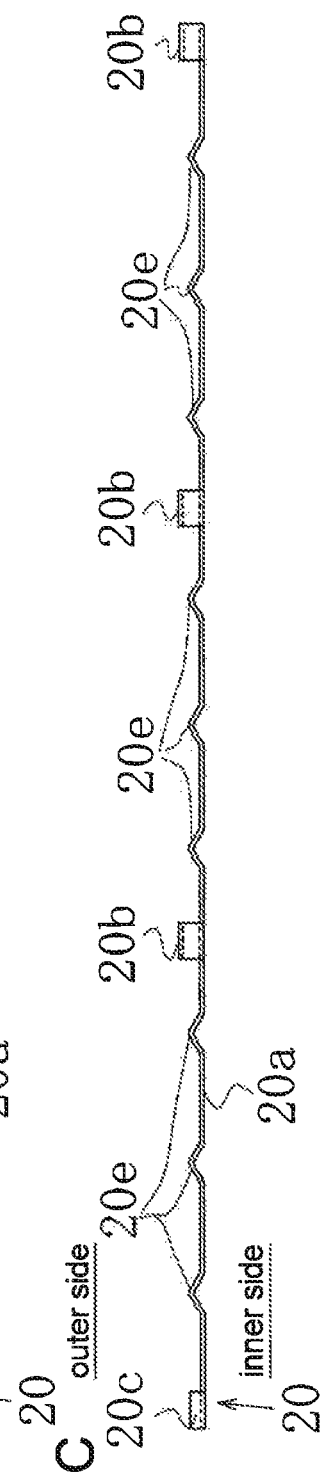

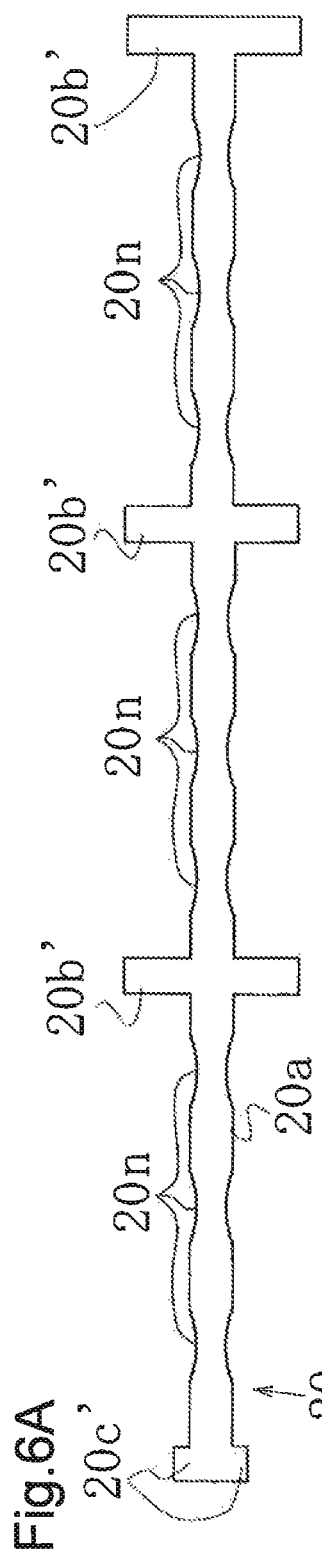
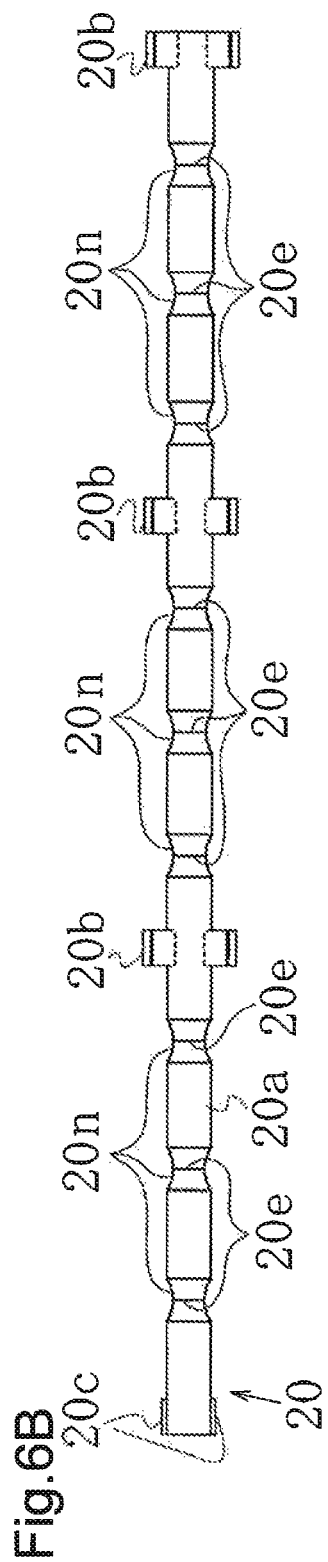
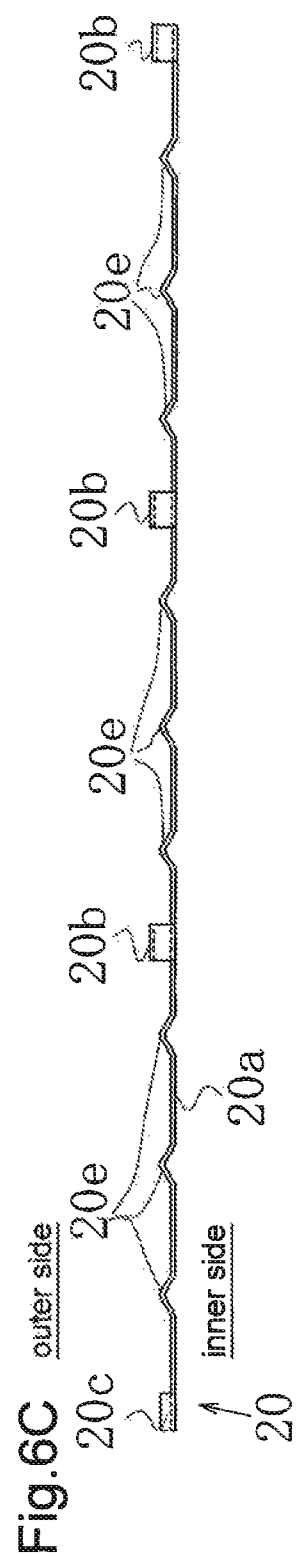

DIAPHRAGM DAMPER DEVICE, HOLDING MEMBER THEREFOR, AND PRODUCTION METHOD FOR DIAPHRAGM DAMPER DEVICE

TECHNICAL FIELD

The present invention relates to a pulsation-absorbing diaphragm damper device used at a location where pulsation of a high-pressure fuel pump or the like occurs, a holding member of the diaphragm damper device, and a method for manufacturing the diaphragm damper device.

BACKGROUND ART

A known device that absorbs such type of pulsation includes a diaphragm damper device located in, for example, a fluid passage of a high-pressure fuel pump (hereinafter referred to as "prior art." Refer to, for example, patent document 1). In the prior art, a damper device arranged in a fluid passage of a high-pressure fuel pump absorbs pressure pulsation of fuel discharged from the high-pressure fuel pump and reduces the pulsation width of the fuel pressure to stabilize the injection amount of the fuel.

In the diaphragm damper device of the prior art, in order to increase the effect for reducing the fuel pressure pulsation, as shown in FIG. 7, two diaphragm dampers 51 and 55 are arranged in the vertical direction. Diaphragms 52 and 53 of the first diaphragm damper 51 are held between a first support 61 and a third support 63, and diaphragms 56 and 57 of the second diaphragm damper 55 are held between a second support 62 and the third support 63.

The diaphragms 52 and 53 of the first diaphragm damper 51, the first support 61, and the third support 63 are welded and integrally fixed together at outer circumferential ends of the first diaphragm damper 51. In the same manner, the diaphragms 56 and 57 of the second diaphragm damper 55, the second support 62, and the third support 63 are welded and integrally fixed together at outer circumferential ends of the second diaphragm damper 55.

When setting a plurality of diaphragm dampers, the diaphragm dampers need to be integrated in order to increase the coupling efficiency. For example, when manufacturing a diaphragm damper device 50 including the plurality of diaphragm dampers 51 and 55 like in the prior art shown in FIG. 7, the enclosing of gas into the two diaphragm dampers 51 and 55 and the welding of the outer circumferential ends are simultaneously performed in a pressure container in which a gas mixture including helium is enclosed. More specifically, in a state in which there is a gap between the diaphragms 52 and 53 of the first diaphragm damper 51 and between the diaphragms 56 and 57 of the second diaphragm damper 55, high-pressure gas is drawn into the inside (gaps) of the diaphragms. In a state in which the diaphragm 53 of the first diaphragm damper 51 and the diaphragm 56 of the second diaphragm damper 55 are held by the third support 63, the diaphragm 52 of the first diaphragm damper 51 is upwardly moved with the first support 61 to contact the corresponding diaphragm, and the diaphragm 57 of the second diaphragm damper 55 is downwardly moved with the second support 62 to contact the corresponding diaphragm. The outer circumferential end surfaces of the two diaphragm dampers 51 and 55 are irradiated with a laser beam to entirely weld the outer circumferences of the diaphragm dampers 51 and 55 while rotating the pair of diaphragms 52 and 53 and the pair of diaphragms 56 and 57 in a state in which the diaphragms 52 and 53 are in contact with each other and the diaphragms 56 and 57 are in contact with each other.

In this manner, in the damper device of the prior art, the drawing of gas and welding need to be performed while simultaneously holding and moving all of the diaphragms of the two diaphragm dampers 51 and 55. Thus, the manufacturing device is complicated and large. Such a situation becomes prominent when increasing the number of diaphragm dampers to increase the effect for reducing fuel pressure pulsation.

PRIOR ART DOCUMENT

Patent Document

Patent Document 1: Japanese Laid-Open Patent Publication No. 2013-227877

SUMMARY OF THE INVENTION

Problems that are to be Solved by the Invention

It is an object of the present invention to provide a diaphragm damper device that is easily manufactured and has a high fluid pressure pulsation reducing effect, a holding member that allows such a diaphragm damper device to be provided, and a method for manufacturing the diaphragm damper device that uses such a holding member.

Means for Solving the Problem

A holding member for a diaphragm damper device that achieves the above object includes a plurality of stacked diaphragm dampers. Each of the diaphragm dampers includes a pair of diaphragms and a high-pressure chamber defined by the pair of diaphragms. High-pressure gas is enclosed in the high-pressure chamber. Circumferential portions of the pair of diaphragms are overlapped with and fixed to each other. The holding member is formed from an elastic member. The holding member includes a band that can be elastically tightened to circumferential walls of two adjacent ones of the diaphragm dampers and hooks arranged on two sides of the band. The hooks elastically hold the two adjacent ones of the diaphragm dampers, respectively.

In the above structure, the separately manufactured diaphragm dampers are integrally held by the holding member including the band and the hooks. Thus, the drawing of high-pressure gas into the diaphragm dampers and the welding of the outer circumferential ends of the diaphragm dampers are facilitated. This facilitates manufacturing tasks and prevents the manufacturing device from being complicated. This further ensures that the hooks arranged on the two sides of the band hold the diaphragm dampers. Thus, the diaphragm damper device has a high fluid pressure pulsation reducing effect.

It is preferred that the band include a plurality of ridge-shaped bent portions that are bent in a direction orthogonal to a longitudinal direction.

In the above structure, the diaphragm dampers can be wound and held by the band with proper tension.

It is preferred that the band include a plurality of narrow portions having a dimension in a widthwise direction orthogonal to the longitudinal direction of the band that is smaller than dimensions of other portions of the band and that the bent portions be arranged in the narrow portions of the band.

In the above structure, the band can be stretched with a relatively small force.

It is preferred that the band include a plurality of holes that are spaced apart from each other in the longitudinal direction of the band and that the bent portions be located at positions overlapping the holes.

In the above structure, the band can be stretched with a relatively small force.

It is preferred that the hooks be paired at the two sides of the band.

In the above structure, the holding member has a simple shape. Thus, the holding member can be coupled to the diaphragm dampers in any direction. This allows for easy coupling of the diaphragm dampers.

It is preferred that the band include a first end provided with an engagement portion and a second end provided with the hook that is configured to engage the engagement portion.

A diaphragm damper device that achieves the above object includes a plurality of stacked diaphragm dampers. Each of the diaphragm dampers includes a pair of diaphragms and a high-pressure chamber defined by the pair of diaphragms. High-pressure gas is enclosed in the high-pressure chamber. Circumferential portions of the pair of diaphragms are overlapped with and fixed to each other. The diaphragm damper device further includes a holding member that integrally holds the diaphragm dampers and is formed from an elastic member. The holding member includes a band that can be elastically tightened to circumferential walls of two adjacent ones of the diaphragm dampers, and hooks arranged on two sides of the band. The hooks elastically hold the two adjacent ones of the diaphragm dampers, respectively.

In the above structure, the separately manufactured diaphragm dampers are integrally held by the holding member including the band and the hooks. Thus, the drawing of high-pressure gas into the diaphragm dampers and the welding of the outer circumferential ends of the diaphragm dampers are facilitated. This facilitates manufacturing tasks and prevents the manufacturing device from being complicated. This further ensures that the hooks arranged on the two sides of the band hold the diaphragm dampers. Thus, the diaphragm damper device has a high fluid pressure pulsation reducing effect.

A method for manufacturing a diaphragm damper device that achieves the above object includes forming a first diaphragm damper that includes a pair of diaphragms and a high-pressure chamber defined by the pair of diaphragms. High-pressure gas is enclosed in the high-pressure chamber. The method includes forming a second diaphragm damper that includes a pair of diaphragms and a high-pressure chamber defined by the pair of diaphragms. High-pressure gas is enclosed in the high-pressure chamber. The method includes stacking the first diaphragm damper and the second diaphragm damper. The method includes preparing a holding member formed from an elastic member. The holding member includes a band and first and second hooks arranged on two sides of the band. The method includes integrally holding the first diaphragm damper and the second diaphragm damper by elastically tightening the band of the holding member to circumferences walls of the first diaphragm damper and the second diaphragm damper and elastically holding outer circumferential ends of the first and second diaphragm dampers with the first and second hooks, respectively.

In the above manufacturing method, the diaphragm dampers are separately manufactured so that the separately manufactured diaphragm dampers are integrally held by the holding member. Thus, when manufacturing the diaphragm damper device including the diaphragm dampers, the drawing of high-pressure gas into the diaphragm dampers and the welding of the outer circumferential ends of the diaphragm dampers are facilitated. This facilitates manufacturing tasks and prevents the manufacturing device from being complicated.

BRIEF DESCRIPTION OF THE DRAWINGS

FIG. 2A is a net diagram showing the holding member that holds a diaphragm damper used for the diaphragm damper device of FIG. 1 in a state immediately after the holding member has been press-formed.

FIG. 2B is a net diagram showing the holding member of FIG. 2A in a state after the holding member has been machined.

FIG. 2C is a net diagram showing a side surface of the holding member of FIG. 2B.

FIG. 6A is a net diagram showing a holding member of another example used for the diaphragm damper device of FIG. 1 in a state immediately after the holding member has been press-formed.

FIG. 6B is a net diagram showing the holding member of FIG. 6A in a state after the holding member has been machined.

FIG. 6C is a net diagram showing a side surface of the holding member of FIG. 6B.

EMBODIMENTS OF THE INVENTION

The embodiment of the present invention will now be exemplified with reference to the drawings. However, as long as there is no explicit description, the range of the present invention is not limited only to the dimension, material, shape, relative arrangement, and the like of components described in the embodiment.

First Embodiment

A diaphragm damper device 10 and a holding member 20 arranged in the diaphragm damper device 10 according to a first embodiment of the present invention will now be described with reference to FIGS. 1 to 5.

Figure 1:
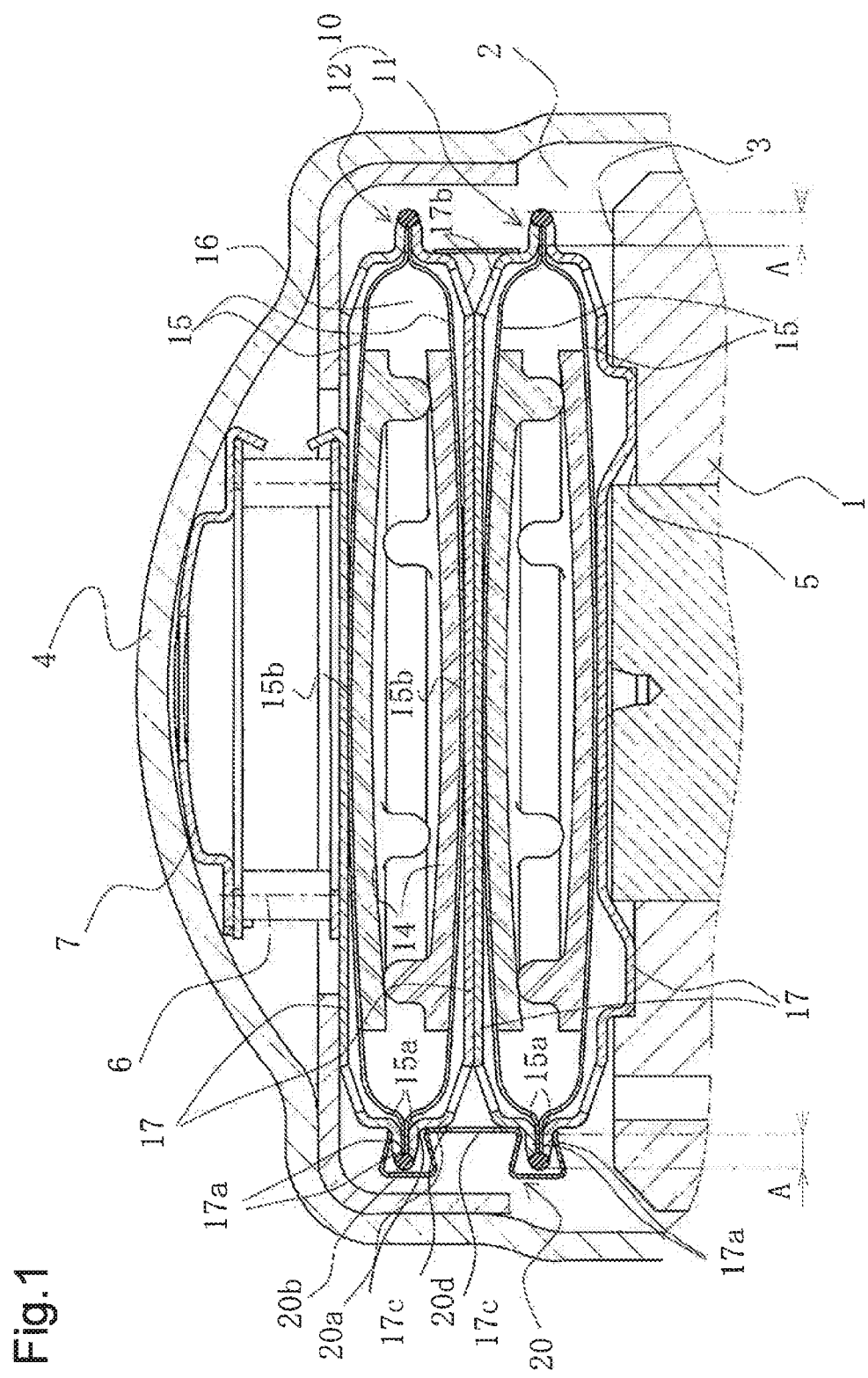
FIG. 1 is a vertical, cross-sectional view showing a diaphragm damper device and a holding member according to a first embodiment of the present invention.

The diaphragm damper device 10 shown in FIG. 1 is used in a high-pressure pump that reciprocates a plunger to pressurize fuel supplied from a fuel tank and force the fuel toward an injector.

The high-pressure pump includes a fuel chamber 2 that can contain fuel supplied from the outside. The high-pressure pump pressurizes and discharges fuel by repeating a "suction process" that draws fuel from the fuel chamber 2 into a pressurizing chamber when the plunger descends, a "metering process" that returns some of the fuel of the pressurizing chamber to the fuel chamber 2 when the plunger ascends, and a "pressurizing process" that pressurizes the fuel when the plunger further ascends after closing a suction valve.

The diaphragm damper device 10 is used to reduce pulsation generated in the fuel chamber 2 of such a high-pressure pump.

As shown in FIG. 1, the fuel chamber 2 is defined by an upper portion 3 of a housing 1 of the high-pressure pump and an inner surface of a tubular cover 4 that includes a closed end. The cover 4 is fitted onto and fixed to the upper portion 3 of the housing 1. Although not illustrated in the drawings, a lower portion of the cover 4 is joined in contact with the housing 1.

In FIG. 1, the upper side on the plane of the drawing is referred to as the upper side of the device, and the lower side on the plane of the drawing is referred to as the lower side of the device.

The diaphragm damper device 10 is arranged in the fuel chamber 2. The diaphragm damper device 10 includes two diaphragm dampers 11 and 12 arranged (stacked) in the vertical direction to increase the effect for reducing fluid pressure pulsation.

The lower diaphragm damper 11 and the upper diaphragm damper 12 have the same basic structure.

The diaphragm dampers 11 and 12 each include two disk-shaped diaphragms 15 and 15 and a high-pressure chamber 16 defined between the two disk-shaped diaphragms 15 and 15. High-pressure gas is enclosed in the high-pressure chamber 16. The outer sides of the two disk-shaped diaphragms 15 and 15 are covered by two disk-shaped cover members 17 and 17, respectively.

Two rubber elastic members 14 and 14 are arranged in the high-pressure chamber 16.

The diaphragm dampers 11 and 12 are separately manufactured, held in a state arranged (stacked) in the vertical direction, and arranged in a location defined by the housing 1 and the inner surface of the cover 4.

Each cover member 17 includes a plurality of holes 17b. The holes 17b allow for the flow of fluid such as fuel. The holes 17b allow an external fluid to freely enter and exit the space between the cover member 17 and the corresponding diaphragm 15.

The holding member 20 integrally holds the two diaphragm dampers 11 and 12, which are stacked in the vertical direction.

The holding member 20 will be described in detail later.

The two diaphragm dampers 11 and 12 are mounted on the upper portion 3 of the housing 1 and downwardly biased so that they are pressed toward the housing 1 by a coupling member 7 and a coiled wave spring 6, which are attached to the inner side of the cover 4. This fixes the two diaphragm dampers 11 and 12 to the housing 1.

The lower cover member 17 of the lower diaphragm damper 11 is shaped to easily conform to a recess 5 in the upper portion 3 of the housing 1. Nevertheless, the lower cover member 17 functions as a cover member in the same manner as other cover members.

The diaphragm dampers 11 and 12 will each be described.

The two disk-shaped diaphragms 15 and 15 are formed with the same shape from a thin, flexible metal plate so that middle portions 15b and 15b are flexible. Further, the two disk-shaped cover members 17 and 17 are formed from a metal and support the diaphragms 15 and 15. The cover members 17 and 17 are thicker than the diaphragms 15 and 15.

The two disk-shaped diaphragms 15 and 15 respectively include circumferential portions 15a and 15a that are overlapped with each other. The overlapping circumferential portions 15a and 15a are held by holding portions 17a and 17a defined by circumferential portions of the two disk-shaped cover members 17 and 17.

At the same time as when high-pressure gas is enclosed inside of the two diaphragms 15 and 15, the circumferential portions 15a and 15a of the two diaphragms 15 and 15 are arranged on outer circumferential ends A of the holding portions 17a and 17a of the two cover members 17 and 17. Further, the circumferential portions 15a and 15a and the outer circumferential ends A, which are in contact with one another, are continuously sealed and joined through laser welding performed over the entire circumference to seal the high-pressure chambers 16.

When laser welding is performed, the two cover members 17 and 17 are each held by a jig (not shown) to keep the circumferential portions 15a and 15a of the two diaphragms 15 and 15 in contact with the outer circumferential ends A of the two cover members 17 and 17.

For example, seam welding with YAG laser is used as laser welding.

The structure for holding the two separately produced diaphragm dampers 11 and 12 in a vertically stacked state with the holding member 20 will now be described.

As shown in FIG. 1, the holding member 20, which is formed from an elastic material, includes a band 20a and a pair of hooks 20b and 20b arranged on two sides of the band 20a. The band 20a is configured to be elastically tightened to a circumferential wall 17c of the upper cover member 17 of the lower diaphragm damper 11 and a circumferential wall 17c of the lower cover member 17 of the upper diaphragm damper 12. The hooks 20b and 20b are configured to elastically hold the outer circumferential ends A of the diaphragm dampers 11 and 12, respectively. In further detail, one of the hooks 20b (first hook) arranged on the lower side of the band 20a elastically holds the outer circumferential end A of the lower diaphragm damper 11 (first diaphragm damper), and the other one of the hooks 20b (second hook) arranged on the upper side of the band 20a elastically holds the outer circumferential end A of the upper diaphragm damper 12 (second diaphragm damper).

The production process of the holding member 20 and the shape of the holding member 20 after the production will now be described with reference to FIG. 2.

First, an elastic plate is pressed into the state shown in FIG. 2A.

In FIG. 2A, the two widthwise sides of one end (left end) of the elongated band 20a include a pair of wide portions 20c' and 20c', and the two widthwise sides of the other end (right end) of the band 20a include a pair of wide portions 20b' and 20b'. As will be described later, the pair of wide portions 20c' and 20c' forms a pair of engagement portions 20c and 20c shown in FIGS. 2B and 2C, and the pair of wide portions 20b' and 20b' forms a pair of the hooks 20b and 20b shown in FIGS. 2B and 2C (refer to FIG. 4). In addition to the right end, two portions of the band 20a include the pair of wide portions 20b' and 20b'. A total of three pairs of the wide portions 20b' and 20b' are arranged at substantially equal intervals in the longitudinal direction.

The pairs of hooks 20b and 20b do not have to be arranged at three positions and only need to be arranged at least at one position. However, it is preferred that there be more hooks to ensure that the diaphragm dampers 11 and 12 are held.

Further, the hooks do not have to be paired on the band (that is, hooks do not have to be arranged at the same position of the band in the longitudinal direction). For example, hooks may be alternately arranged on the band (alternated from one side to other side) at equal intervals on each side.

Further, the band 20a includes a plurality of holes 20d that allow fluid to flow through the band 20a. The holes 20d are spaced apart from one another in the longitudinal direction at the substantially middle part of the band 20a in the widthwise direction.

The press-formed plate of FIG. 2A is bent as shown in FIGS. 2B and 2C.

More specifically, the longitudinally middle part of each hole 20d in the band 20a is bent in a direction orthogonal to the longitudinal direction of the band 20a to obtain a ridge-shaped bent portion 20e. In detail, as shown in FIG. 2C, each bent portion 20e is bent to be ridge-shaped in a side view of the band 20a.

The bent portions 20e produce tension in the longitudinal direction to the band 20a when wound. For example, when the two diaphragm dampers 11 and 12 arranged in the vertical direction are shifted away from each other in the radial direction, the bent portions 20e function to return the shifted diaphragm dampers 11 and 12 to a concentric state.

In the present example, each bent portion 20e is located at a position overlapping the corresponding hole 20d. Instead, each bent portion 20e may be located at a position separated from the corresponding hole 20d.

When the bent portions 20e are located at positions overlapping the holes 20d, the band 20a can be stretched with a relatively small force.

As shown in FIG. 6A illustrating a substitutional example, instead of the holes 20d, the band 20a may include narrow portions 20n having a dimension in the widthwise direction orthogonal to the longitudinal direction of the band 20a that is smaller than dimensions of other portions of the band 20a. Further, as shown in FIG. 6B, the bent portions 20e may be formed in the narrow portions 20n of the band 20a. In this case, the band 20a can also be stretched with a relatively small force.

As shown in FIG. 2C, the two wide portions 20c' and 20c' at the two widthwise sides of the left end of the band 20a are outwardly bent at a right angle to form the pair of engagement portions 20c and 20c.

Figure 4:
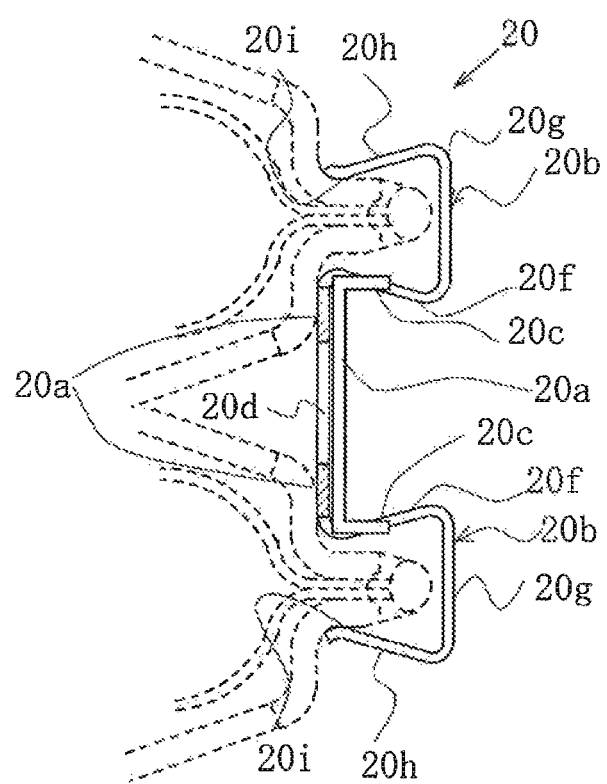
FIG. 4 is a cross-sectional view taken along line 4-4 in FIG. 3A.

Further, the three pairs of wide portions 20b' and 20b' are bent to form three pairs of the hooks 20b and 20b. FIG. 4, in particular, clearly shows that each pair of the hooks 20b and 20b includes outwardly-directed portions 20f and 20f, outer portions 20g and 20g, and inwardly-directed portions 20h and 20h. The outwardly-directed portions 20f and 20f extend outwardly from the two widthwise sides of the band 20a. The outer portions 20g and 20g extend from the outwardly-directed portions 20f and 20f in the widthwise direction of the band 20a and in a direction in which the outer portions 20g and 20g are spaced apart from each other. The inwardly-directed portions 20h and 20h extend inwardly from the outer portions 20g and 20g. The outwardly-directed portions 20f and 20f, the outer portions 20g and 20g, and the inwardly-directed portions 20h and 20h are arranged so as to have a substantially triangular shape in a side view and be provided with an insertion opening 20i that opens freely in the inward direction.

The coupling of the two diaphragm dampers 11 and 12 arranged in the vertical direction will now be described.

The two diaphragm dampers 11 and 12 arranged in the vertical direction are held one above the other so that their centers in the radial direction coincide with each other.

Subsequently, as shown in FIG. 1, the holding member 20 is arranged at a middle location in the vertical direction between the two diaphragm dampers 11 and 12, and the holding member 20 is wound so that the band 20a extends along the circumferential walls 17c of the upper cover member 17 of the upper diaphragm damper 12 and the circumferential walls 17c of the lower cover member 17 of the upper diaphragm damper 12. At the same time, the insertion openings 20i of the hooks 20b and 20b are opened against elastic force so that the hooks 20b and 20b hold and encompass the outer circumferential ends A and A of the diaphragm dampers 11 and 12 from the outside.

Figure 3A:
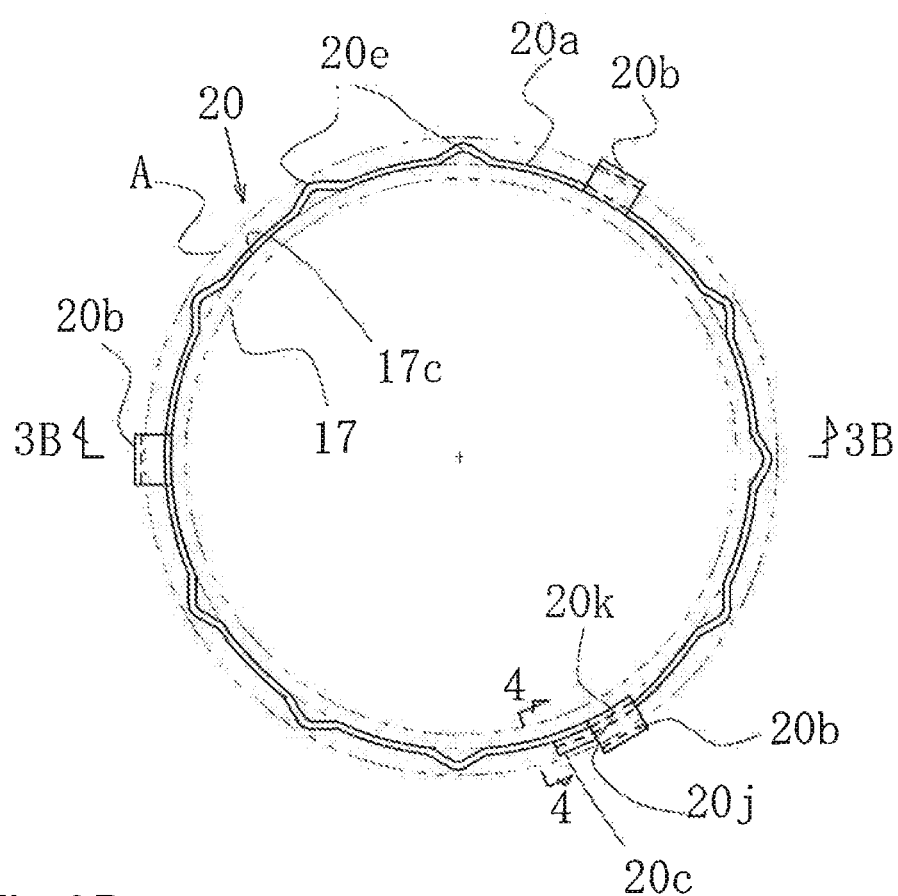
FIG. 3A is a plan view showing an attached state of the holding member.
Figure 3B:
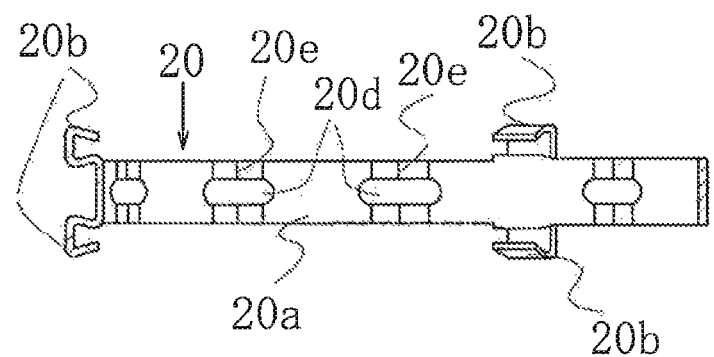
FIG. 3B is a cross-sectional view taken along line 3B-3B in FIG. 3A.

Then, as shown in FIG. 3A, the engagement portions 20c and 20c at one end of the band 20a are tightened onto the hooks 20b and 20b at the other end of the band 20a so that the engagement portions 20c and 20c are arranged beyond the hooks 20b and 20b in the circumferential direction and so that right ends 20k of the engagement portions 20c and 20c abut against left ends 20j of the hooks 20b and 20b. The bent portions 20e are slightly stretched so that resiliency of the bent portions 20e winds the band 20a around the circumferential walls 17c with proper tension. Further, the hooks 20b and 20b elastically hold the outer circumferential ends A and A of the diaphragm dampers 11 and 12.

FIG. 3A shows a wound state of the holding member 20. As described above, the engagement portions 20c and 20c of one end of the band 20a are tightened onto the hooks 20b and 20b of the other end of the band 20a so that the engagement portions 20c and 20c are arranged beyond the hooks 20b and 20b in the circumferential direction and so that the right ends 20k of the engagement portions 20c and 20c abut against the left ends 20j of the hooks 20b and 20b. In this state, the bent portions 20e act to apply suitable tension to the wound band 20a. This restricts disengagement of the hooks 20b and 20b from the engagement portions 20c and 20c. Further, the outer circumferential ends A and A of the diaphragm dampers 11 and 12 are elastically held by the hooks 20b and 20b. Thus, the diaphragm dampers 11 and 12 do not move away from each other in the vertical direction or shift away from each other in the radial direction.

FIG. 4 shows an engaged state of the hooks 20b and 20b and the engagement portions 20c and 20c. It can be understood that the engagement portions 20c and 20c are engaged with the outwardly-directed portions 20f and 20f of the hooks 20b and 20b.

Figure 5:
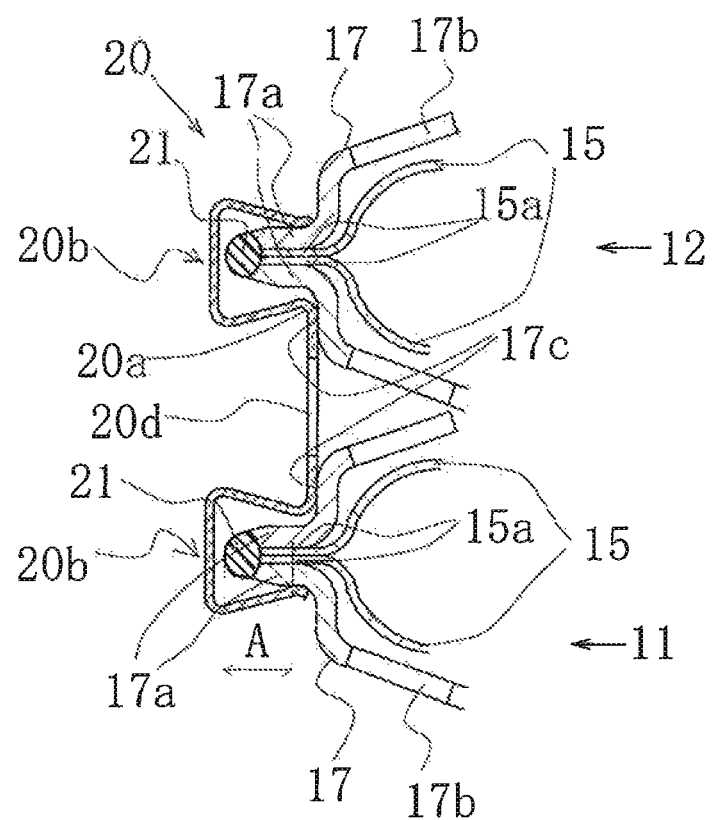
FIG. 5 is a partially enlarged view showing the diaphragm damper device of FIG. 1 in a state in which hooks of the holding member hold outer circumferential ends of the diaphragm dampers.
Figure 7:
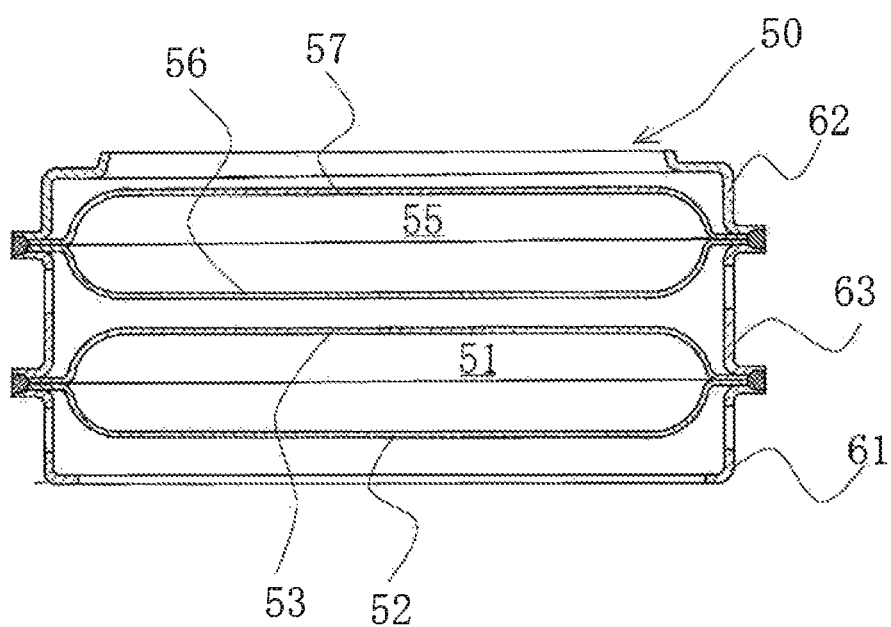
FIG. 7 is a diagram showing the prior art.

The positional relationship of the hooks 20b and 20b of the holding member 20 and the outer circumferential ends A of the diaphragm dampers 11 and 12 will now be described with reference to FIG. 5.

In a state in which the hooks 20b and 20b elastically hold the outer circumferential ends A and A, the hooks 20b and 20b are sized so that the outwardly-directed portions 20f and 20f, the outer portions 20g and 20g, and the inwardly-directed portions 20h and 20h of the hooks 20b do not contact weld beads 21, which are formed when the outer circumferential ends A are welded. Thus, the hooks 20b and 20b do not contact the weld beads 21.

If the hooks 20b and 20b contact the weld beads 21, the weld beads 21 may be rubbed and abraded, and the abrasion dust may be dispersed as foreign matter and mixed with fuel or the like causing an adverse effect. However, in the present embodiment, the hooks 20b and 20b do not contact the weld beads 21. This prevents the occurrence of an adverse effect caused by the formation of abrasion dust.

As described above, the first embodiment has the following prominent advantages.

(1) The holding member 20 integrally holds the diaphragm dampers 11 and 12 that are separately manufactured. That is, when manufacturing the diaphragm damper device 10, the plurality of diaphragm dampers 11 and 12 can be separately manufactured, and the separately-manufactured diaphragm dampers 11 and 12 can be integrally held by the holding member 20. Thus, as compared to when the holding member 20 is not used, the drawing of high-pressure gas into the diaphragm dampers 11 and 12 and the welding of the outer circumferential ends A of the diaphragm dampers are facilitated. This facilitates manufacturing tasks and prevents the manufacturing device from being complicated. This further ensures that the pairs of hooks 20b and 20b hold the two diaphragm dampers 11 and 12. Thus, the diaphragm damper device 10 has a high fluid pressure pulsation reducing effect.

(2) The band 20a of the holding member 20 includes the ridge-shaped bent portions 20e bent in the direction orthogonal to the longitudinal direction. Thus, the diaphragm dampers 11 and 12 can be wound and held with proper tension.

(3) When the bent portions 20e are arranged at portions where the width of the band 20a is narrow (narrow portions 20n), the band 20a can be stretched with a relatively small force.

(4) When the bent portions 20e are located at the positions of the holes 20d, the band 20a can be stretched with a relatively small force.

(5) When the hooks 20b of the holding member 20 are paired at the two sides of the band 20a, the holding member has a simple shape. Thus, the holding member 20 can be coupled to the diaphragm dampers 11 and 12 in any direction. This allows for easy coupling of the diaphragm dampers 11 and 12.

The embodiment of the present invention has been described with reference to the drawings. However, the specific structure is not limited to the embodiment. Modifications and additions without departing from the scope of the present invention are included in the present invention.

DESCRIPTION OF REFERENCE CHARACTERS

1: Housing
2: Fuel chamber
3: Upper portion of housing
4: Cover
5: Recess
6: Coiled wave spring
7: Coupling member
10: Diaphragm damper device
11: Lower (first) diaphragm damper
12: Upper (second) diaphragm damper
14: Rubber elastic member
15: Diaphragm
15a: Circumferential portion
15b: Middle portion
16: High-pressure chamber
17: Cover member
17a: Holding portion
17b: Hole
17c: Circumferential wall
20: Holding member
20a: Band
20b: Hook (first, second hooks)
20c: Engagement portion
20d: Hole
20e: Bent portion
20f: Outwardly-directed portion
20g: Outer portion
20h: Inwardly-directed portion
20i: Insertion opening
20n: Narrow portion
21: Weld bead
A: Outer circumferential end

The invention claimed is:

1. A holding member for a diaphragm damper device including a plurality of diaphragm dampers that are stacked in a vertical direction, wherein
each of the diaphragm dampers includes a pair of diaphragms and a high-pressure chamber defined by the pair of diaphragms, wherein high-pressure gas is enclosed in the high-pressure chamber, and circumferential portions of the pair of diaphragms are overlapped with and fixed to each other,
the holding member is formed from an elastic member, and
the holding member comprises:
a band that extends around an entire circumference of two adjacent ones of the diaphragm dampers to be elastically tightened to circumferential walls of the diaphragm dampers in the circumferential direction; and
hooks arranged on two sides of the band, wherein the hooks elastically hold the two adjacent ones of the diaphragm dampers that are stacked in the vertical direction, respectively.

2. The holding member for the diaphragm damper device according to claim 1, wherein the band includes a plurality of ridge-shaped bent portions that are bent in a direction orthogonal to a longitudinal direction.

3. The holding member for the diaphragm damper device according to claim 2, wherein
the band includes a plurality of narrow portions having a dimension in a widthwise direction orthogonal to the longitudinal direction of the band that is smaller than dimensions of other portions of the band, and
the bent portions are arranged in the narrow portions of the band.

4. The holding member for the diaphragm damper device according to claim 2, wherein
the band includes a plurality of holes that are spaced apart from each other in the longitudinal direction of the band, and
the bent portions are located at positions overlapping the holes.

5. The holding member for the diaphragm damper device according to claim 1, wherein the hooks are paired at the two sides of the band.

6. The holding member for the diaphragm damper device according to claim 1, wherein the band includes a first end provided with an engagement portion and a second end provided with the hook that is configured to engage the engagement portion.

7. The holding member for the diaphragm damper device according to claim 1,
wherein the band includes:
a plurality of narrow portions having a dimension in a widthwise direction orthogonal to the longitudinal direction of the band that is smaller than dimensions of other portions of the band; or
the band includes a plurality of holes that are spaced apart from each other in the longitudinal direction of the band.

8. A diaphragm damper device comprising:
a plurality of diaphragm dampers that are stacked in a vertical direction, wherein each of the diaphragm dampers includes a pair of diaphragms and a high-pressure chamber defined by the pair of diaphragms, high-pressure gas is enclosed in the high-pressure chamber, and circumferential portions of the pair of diaphragms are overlapped with and fixed to each other; and a holding member that integrally holds the diaphragm dampers and is formed from an elastic member, wherein the holding member includes a band that extends around an entire circumference of two adjacent ones of the diaphragm dampers to be elastically tightened to circumferential walls of the diaphragm dampers in the circumferential direction, and hooks arranged on two sides of the band, wherein the hooks elastically hold the two adjacent ones of the diaphragm dampers that are stacked in the vertical direction, respectively.

9. The diaphragm damper device according to claim 8, wherein the band includes:
a plurality of narrow portions having a dimension in a widthwise direction orthogonal to the longitudinal direction of the band that is smaller than dimensions of other portions of the band; or
the band includes a plurality of holes that are spaced apart from each other in the longitudinal direction of the band.

10. A method for manufacturing a diaphragm damper device, the method comprising:
forming a first diaphragm damper that includes a pair of diaphragms and a high-pressure chamber defined by the pair of diaphragms, wherein high-pressure gas is enclosed in the high-pressure chamber;
forming a second diaphragm damper that includes a pair of diaphragms and a high-pressure chamber defined by the pair of diaphragms, wherein high-pressure gas is enclosed in the high-pressure chamber;
stacking the first diaphragm damper and the second diaphragm damper in a vertical direction;
preparing a holding member formed from an elastic member, wherein the holding member includes a band and first and second hooks arranged on two sides of the band; and
integrally holding the first diaphragm damper and the second diaphragm damper by extending the band of the holding member around an entire circumference of the first and the second diaphragm dampers, elastically tightening the band to circumferences walls of the first and the second diaphragm dampers in the circumferential direction, and elastically holding outer circumferential ends of the first and second diaphragm dampers with the first and second hooks, respectively.

11. The method according to claim 10,
wherein the band includes:
a plurality of narrow portions having a dimension in a widthwise direction orthogonal to the longitudinal direction of the band that is smaller than dimensions of other portions of the band; or
the band includes a plurality of holes that are spaced apart from each other in the longitudinal direction of the band.

* * * * *